(12) United States Patent
Nihart et al.

(10) Patent No.: US 10,773,264 B2
(45) Date of Patent: Sep. 15, 2020

(54) INTERCHANGABLE CENTER SECTION FOR GLASS COATING HOOD (71) Applicant: Arkema Inc., King of Prussia, PA (US)

(72) Inventors: Jeremy Jon Nihart, Pottstown, PA (US); Ryan Christopher Smith, Schwenksville, PA (US); Jeffery Lee Stricker, Narberth, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/777,687

(22) PCT Filed: Nov. 18, 2016

(86) PCT No.: PCT/US2016/062838
§ 371 (c)(1),
(2) Date: May 21, 2018

(87) PCT Pub. No.: WO2017/091470
PCT Pub. Date: Jun. 1, 2017

(65) Prior Publication Data
US 2018/0345301 A1 Dec. 6, 2018

Related U.S. Application Data (60) Provisional application No. 62/259,179, filed on Nov. 24, 2015.

(51) Int. Cl.
B05B 1/20 (2006.01)
B05B 12/16 (2018.01)
C03C 17/00 (2006.01)
B05B 12/18 (2018.01)
C03C 17/245 (2006.01)

(52) U.S. Cl.
CPC .............. B05B 1/20 (2013.01); B05B 12/18 (2018.02); C03C 17/002 (2013.01); C03C 17/005 (2013.01); C03C 17/245 (2013.01); C03C 2218/112 (2013.01); C03C 2218/15 (2013.01)

(58) Field of Classification Search
None
See application file for complete search history.

(56) References Cited

U.S. PATENT DOCUMENTS 3,876,410 A * 4/1975 Scholes ................ C03C 17/005
118/732
3,989,004 A 11/1976 Scholes
(Continued)

FOREIGN PATENT DOCUMENTS

WO WO 96/20142 7/1996
WO WO 01/25503 A1 4/2001

Primary Examiner — Jethro M. Pence
(74) Attorney, Agent, or Firm — Lynn B. Morreale (57) ABSTRACT An apparatus for coating glass articles includes a housing structure defining a chamber for receiving air or other fluid from a source of pressurized air that is in fluid communication with the chamber. The housing structure has an open end and a surface defined along at least a portion of the open end. A hot-swappable insert is removably positioned on the surface. The hot-swappable insert has a series of apertures for distributing the air or other fluid from the chamber and onto a surface of the glass articles that are positioned adjacent the insert. The insert can be replaced with another insert to adjust the flow path of the air or other fluid onto the glass articles.

12 Claims, 5 Drawing Sheets (56) References Cited

U.S. PATENT DOCUMENTS

| | | | |
|---|---|---|---|
| 4,022,601 A | * | 5/1977 | Sopko .................. C03C 17/002 65/60.52 |
| 4,389,234 A | | 6/1983 | Lindner |
| 4,668,268 A | * | 5/1987 | Lindner .................. B05B 13/00 65/60.1 |
| 4,879,970 A | | 11/1989 | Barkalow et al. |
| 5,081,953 A | | 1/1992 | Guthrie et al. |
| 5,140,940 A | | 8/1992 | Linder |
| 5,454,873 A | | 10/1995 | Scholes et al. |
| 5,584,903 A | | 12/1996 | Guthrie et al. |
| 5,599,369 A | | 2/1997 | Townsend et al. |
| 2015/0101537 A1 | | 4/2015 | Fahey |

* cited by examiner

INTERCHANGABLE CENTER SECTION FOR GLASS COATING HOOD

CROSS-REFERENCE TO RELATED APPLICATIONS

This application is a national stage application under 35 U.S.C. § 371 of PCT/US2016/062838 filed Nov. 18, 2016, which claims benefit to U.S. patent application Ser. No. 62/259,179, filed Nov. 24, 2015.

FIELD OF THE INVENTION

This invention relates to a coating hood for coating glass containers.

BACKGROUND OF THE INVENTION

In the process of manufacturing a glass container, the exterior surface of the glass container is typically coated with a metal-oxide coating, for example, to improve its structural integrity.

The coating process is traditionally performed in a coating hood. Coating hoods are disclosed in U.S. Patent Application Pub. No. 2015/0101537; U.S. Pat. Nos. 4,389,234; 5,081,953, 5,140,940, 5,454,873, 5,599,369, 5,584,903; and PCT Patent App. Pub. No. WO1996020142, for example, each of which is incorporated herein by reference in its entirety. In an assembly line style operation, coating vapor is sprayed onto the exterior surface of a glass container as the glass container passes either below or under a center section of the coating hood. The coating is typically prevented from being applied to the closure region of the container, known in the art as the "finish," by an air stream that is delivered through the center section of the coating hood and onto the closure of the container. The air stream creates a buffer zone that substantially prevents the coating material from settling on the finish.

To accommodate different glass containers having their own unique size and shape (e.g., tall neck beer bottle, baby food jar, wide-mouth jar, etc.), it is often necessary to disassemble the coating hood and replace the entire center section of the coating hood with a different center section that will accommodate glass containers having a different shape and/or size. Taking the coating hood off-line for disassembly and replacement of the center section results in costly downtime.

In view of the foregoing, there exists a need in the glass coating industry to provide an interchangeable and hot-swappable center section for a coating hood.

SUMMARY OF THE INVENTION

According to one aspect of the invention, an apparatus for coating glass articles comprises an elongated housing structure having (i) at least two walls defining an interior chamber for receiving air or other fluid from a blower, and (ii) a mounting surface that is defined along at least a portion of the chamber. A insert is removably positioned on the mounting surface. The insert has apertures for distributing the air or other fluid from the chamber and onto a surface of the glass articles that are positioned adjacent the insert.

According to another aspect of the invention, a kit for coating glass articles comprises the above-described elongated housing structure and a plurality of inserts. Each insert is configured to be removably positioned on the mounting surface, and each insert has apertures for distributing the air or other fluid from the chamber and onto a surface of the glass articles. Each insert has a different arrangement of apertures for directing the air or other fluid onto the glass articles.

According to yet another aspect of the invention, a method for changing an airflow pattern in an apparatus for coating glass articles comprises the steps of:
(a) moving an access panel of the apparatus to gain access to a chamber defined within the apparatus, wherein the chamber is configured to receive air or other fluid from a blower that is in fluid communication with the chamber;
(b) removing a first insert that is positioned within the chamber from the apparatus; and
(c) positioning a second insert into the chamber in place of the first insert, whereby each insert includes a series of apertures that direct the air or other fluid in a particular airflow pattern from the chamber and onto the glass articles positioned adjacent the insert, and the flow pattern defined by the second insert differs from the flow pattern defined by the first insert.

BRIEF DESCRIPTION OF THE DRAWING FIGURES

The invention is best understood from the following detailed description when read in connection with the accompanying drawing. Included in the drawing are the following figures.

DETAILED DESCRIPTION OF THE INVENTION

The invention is best understood from the following detailed description when read in connection with the accompanying drawing figures, which shows exemplary embodiments of the invention selected for illustrative purposes. The invention will be illustrated with reference to the figures. Such figures are intended to be illustrative rather than limiting and are included herewith to facilitate the explanation of the present invention.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly,"

"upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

By way of background to the instant invention, an example of a coating hood is disclosed in U.S. Pat. Nos. 5,081,953 and 5,584,903. The center section of the coating hood of U.S. Pat. No. 5,584,903, for example, is represented by item number 10. This invention relates to the center section of a coating hood, as is described hereinafter.

Figure 1A:
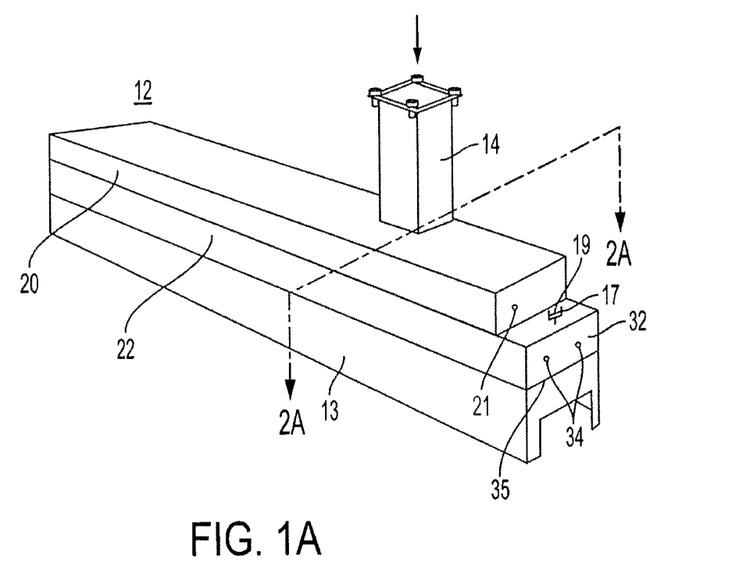
FIG. 1A depicts a perspective view of a center section of a coating hood.
Figure 1B:
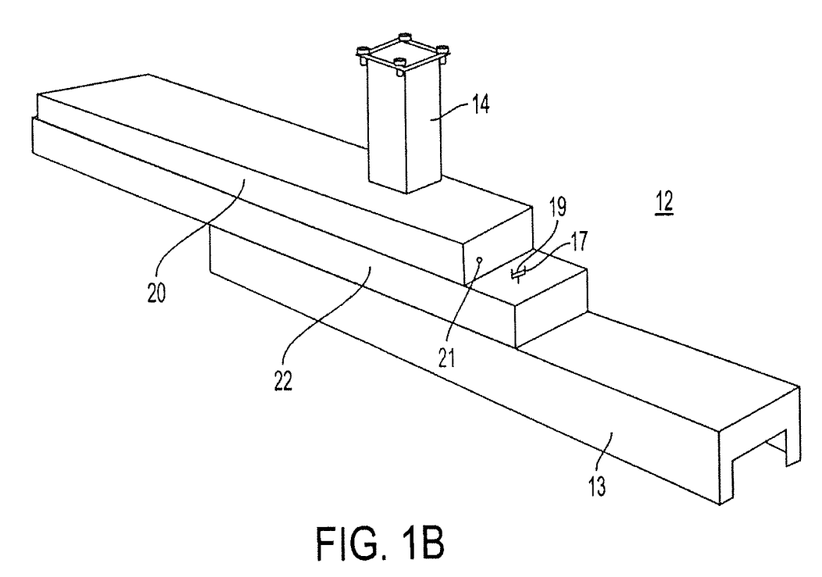
FIG. 1B depicts a perspective view of the center section of FIG. 1A, wherein the interchangeable insert is shown partially disassembled from the remainder of the center section.
Figure 2A:
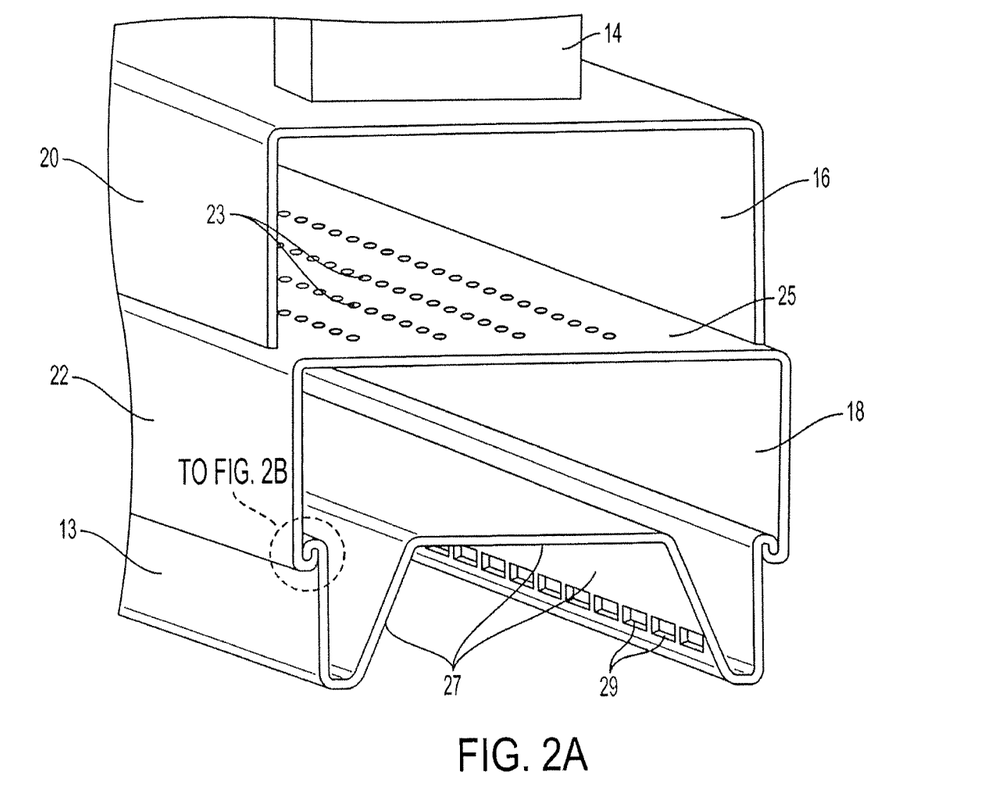
FIG. 2A depicts a perspective cross-sectional view of the center section of FIG. 1A taken along the lines 2A-2A in FIG. 1A.

FIG. 1A depicts a perspective view of a center section 12 of a coating hood, according to one example of the invention. FIG. 1B depicts a perspective view of center section 12 of FIG. 1A, wherein the interchangeable insert 13 is shown partially disassembled from the remainder of the center section 12. FIG. 2A depicts a cross-sectional view of center section 12 taken along the lines 2A-2A in FIG. 1A. It should be understood that the entire coating hood is not shown in these figures.

Center section 12 generally includes a conduit 14, an upper panel 20, a lower panel 22 and an interchangeable insert 13 that are interconnected to form an interior passageway. Air or other fluid is distributed from a source of pressurized air (not shown) connected to conduit 14 through the interior passageway of center section 12 onto glass containers (not shown) positioned beneath insert 13. The source of pressurized air may be a blower, a fan, or a compressed air cylinder, for example. The source of pressurized air may be referred to as a blower hereinafter.

Preferably, upper panel 20, lower panel 22 and insert 13 have approximately the same length and width dimensions to ensure that air will circulate across the entire length of center section 12. The length-wise and width-wise surfaces of upper panel 20, lower panel 22 and insert 13 may be flush. Upper panel 20 may be slightly shorter in length than lower panel 22 and insert 13, as shown, to accommodate a bracket 17 on the top surface of lower panel 22. While upper panel 20 and lower panel 22 are shown as rectangular in cross-section, it should be understood that those panels may be square or circular in cross-section, for example, or any other shape that is capable of carrying air.

Referring now to the individual components of center section 12, conduit 14 extends in a vertical direction and has a hollow rectangular-shaped body. The top end of conduit 14 is either directly or indirectly connected to one or more fans/blowers that are configured to deliver air (or any other fluid) into center section 12. The bottom end of conduit 14 is both connected to and is in fluid communication with an opening formed in the top side of upper panel 20. Conduit 14 may be attached to upper panel 20 by a weld or a fastener, for example. Although conduit 14 is shown having a rectangular-shaped body, those of ordinary skill in the art will recognize that conduit 14 may be tubular or have any other shape that is capable of carrying air.

Upper panel 20 is an elongated, three-sided, U-shaped panel comprising a horizontal wall and two depending legs forming vertical walls that extend beneath the horizontal wall. The horizontal wall of panel 20 includes an opening (not shown) on its top surface that is connected to the lower end of conduit 14. A hollow elongated upper chamber 16 is formed between the interior surfaces of upper panel 20 and a top wall 25 of lower panel 22. The front and rear facing surfaces of panel 20 are covered by covers 21. Covers 21 may be either separate from panel 20 or integrated with panel 20.

A bracket 17 is fixedly positioned on the top wall of upper panel 20, and a pin 19 is mounted in bracket 17. In use, pin 19 is mounted to an end of a vertically extending rod (not shown) that extends above center section 12. The rod is moved in the vertical direction in order to adjust the vertical position of the center section 12 so that center section 12 can accommodate glass containers of varying height. Those skilled in the art will recognize that other ways exist to adjust the vertical position of center section 12.

The lower end of each vertical wall of panel 20 is connected to the upper surface of lower panel 22. The vertical walls of panel 20 may be attached to panel 22 by a weld or a fastener, for example. Alternatively, panels 20 and 22 may be integrated together.

Lower panel 22 is another elongated, three-sided, U-shaped panel comprising a horizontal wall 25 and two depending legs forming vertical walls that extend beneath horizontal wall 25. Horizontal wall 25 includes a series of openings 23 (four rows shown) permitting the passage of air from chamber 16 to chamber 18. Although not shown, horizontal wall 25 of panel 22 may be a separate component that is removably positioned within center section 12 to change the airflow path between chambers 16 and 18. Also, although not shown, in lieu of panel 20, chamber 16 could be provided in the form of a conduit that is positioned inside of chamber 18 to deliver air or other fluid into chamber 18.

Referring back to FIG. 1A, the front facing surface of lower panel 22 is covered by access panel 32, and the rear facing surface of panel 22 (not shown) is covered by a cover (not shown). Access panel 32 is mounted to the front-facing surface of panel 22 by one or more fasteners 34. Access panel 32 extends to an elevation either at or below rail 26 such that access panel 32 retains insert 13 inside of center section 12.

Figure 2B:
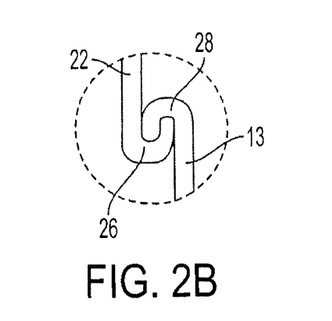
FIG. 2B depicts a detailed view of the connection between the insert and the center section of FIG. 2A.

Insert 13 is positioned at an elevation beneath lower panel 22 such that a second hollow elongated lower chamber 18 is formed between the interior surfaces of lower panel 22 and the top-facing surface(s) of insert 13. Insert 13 is positioned on a mounting surface defined on the free ends of each vertical wall of lower panel 22. The free ends of the vertical walls of lower panel 22 are the ends of panel 22 that are unconstrained and that are not mounted to upper panel 20. More particularly, as shown in the detailed view of FIG. 2B, the free end of each vertical wall of panel 22 includes a U-shaped rail 26 in the form of a curved lip that engages with a complimentary U-shaped rail 28 that is formed on the free end of each side of insert 13. Rail 26 may also be referred to herein as a mounting surface.

Figure 2C:
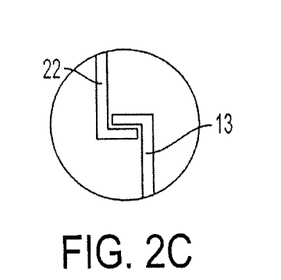
FIGS. 2C and 2D show alternative connections between the insert and the center section.
Figure 2D:
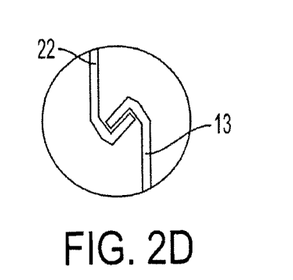

The geometry of rails 26 and 28 may differ from that which is shown and described. For example, instead of having a U-shape, each rail may include a flat perpendicular surface or a V-shape, as shown in FIGS. 2C and 2D, respectively. Rails 26 and 28 are not fixedly mounted together by a weld, for example.

Preferably, insert 13 is not fixedly mounted to or integrated with panel 22. According to one aspect of the invention, no fasteners are required to mount insert 13 to panel 22. Those of ordinary skill in the art will recognize that other mounting arrangements for insert 13 exist.

Insert 13 comprises apertures 29 that are configured to direct air or other fluid onto a specific area of a glass container (e.g., the finish of the container) during the glass coating process. Apertures 29 may be openings, slots, slits or perforations, for example. During that process, the glass container travels along the length dimension of center section 12 at a location that is either adjacent or directly adjacent lower facing surface 27 of insert 13. Preferably, the glass containers are spaced from surface 27 by less than 5 inches. More preferably, the glass containers are spaced from surface 27 by less than 3 inches.

Figure 3:
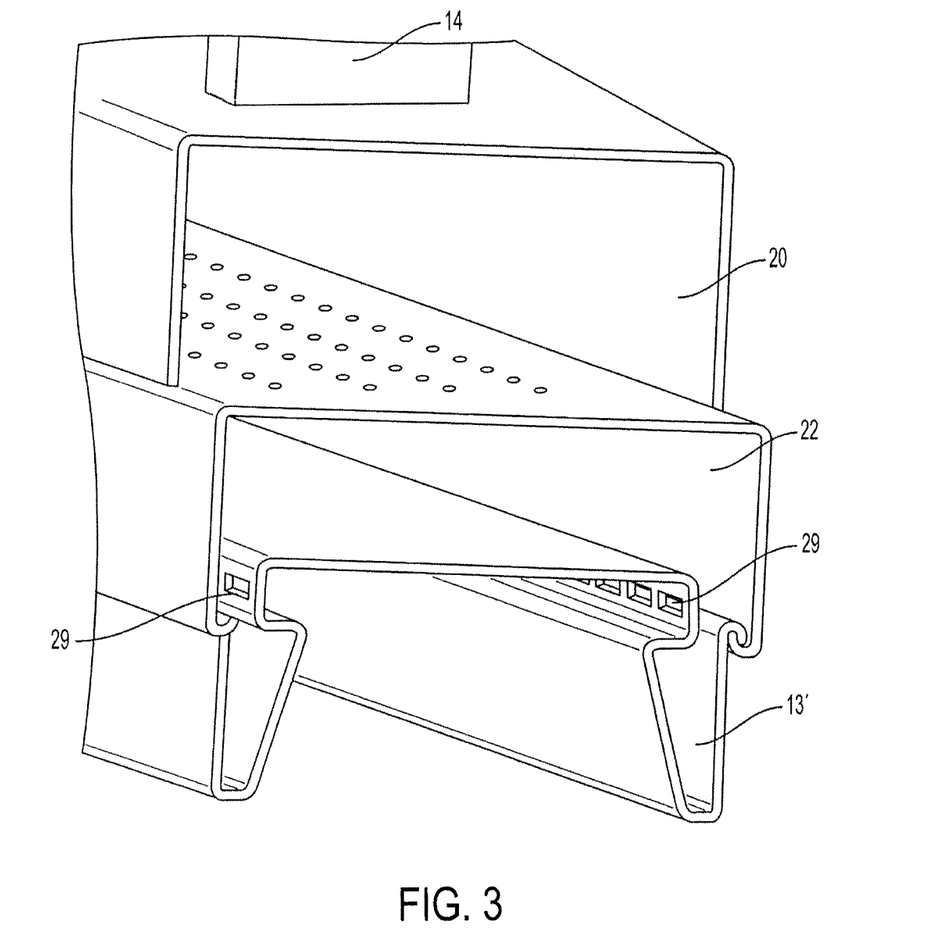
FIG. 3 depicts a perspective view of the center section of FIG. 1A, shown partially cut-away, having a different interchangeable insert than is shown in FIG. 2A.
Figure 4:
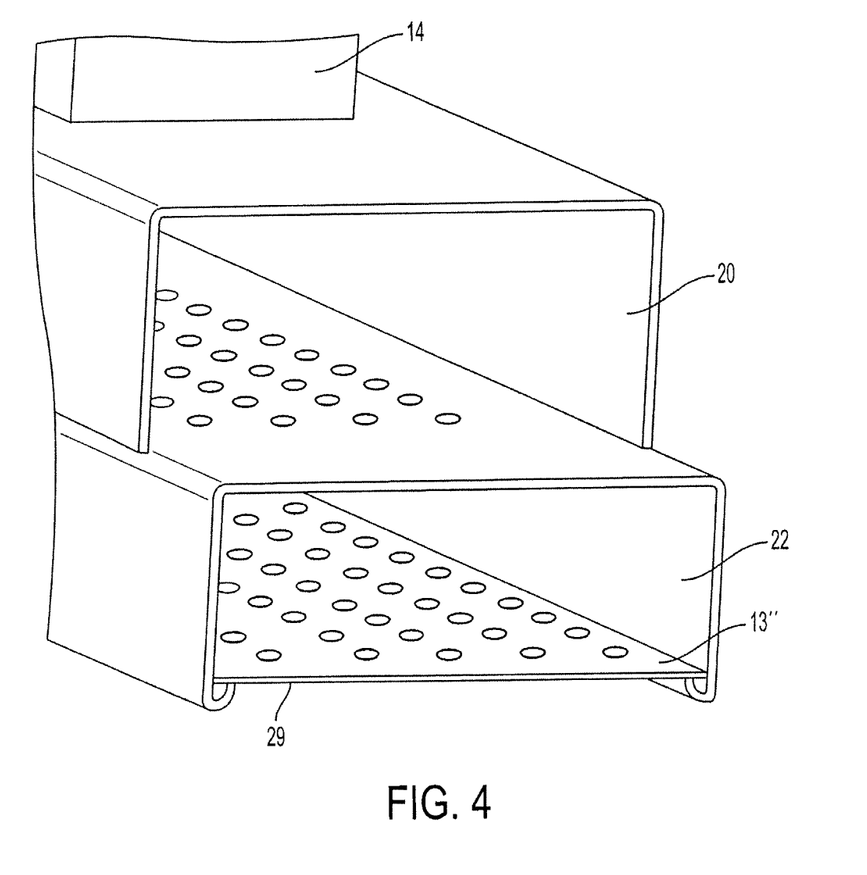
FIG. 4 depicts a perspective view of the center section of FIG. 1A, shown partially cut-away, having a different interchangeable insert than is shown in FIGS. 2A and 3.

The geometry of insert 13 and location of apertures 29 may vary from that which is shown in FIG. 2A. Alternative inserts 13' and 13" are shown in FIGS. 3 and 4, respectively, and it should be understood that further alternative designs exist.

Insert 13 of FIG. 2A has a series of bends for accommodating a container having a wide-shaped container opening, for example. Insert 13' of FIG. 3 also has a series of bends for accommodating a container having a wide-shaped container opening, for example. Insert 13" shown in FIG. 4 is a flat sheet having no bends, and at least a portion of its surface is perforated with apertures 29. Insert 13" may be used for delivering air onto the finish of glass beer bottles, for example. For comparison purposes, apertures 29 defined in insert 13' are positioned at a higher elevation than apertures 29 defined in inserts 13 and 13'. Also, insert 13 and 13' both extend downward to an elevation beneath the rail 26, whereas the entirety of insert 13" sits at an elevation above rail 26.

The insert 13 and panels 20 and 22 of center section 12 are optionally formed from aluminum or steel sheet metal, for example. Alternatively, those components of center section 12 may be formed from a plastic material, if so desired. Insert 13 may be a unitary, integral and monolithic component, as shown, that is formed from one piece of material. Insert 13 may be formed from any material that is known to those of ordinary skill in the art.

During the glass container coating process, the blowers or other source of pressurized air (not shown) delivers air (or other process fluid) through conduit 14 and into upper chamber 16, as indicated by the vertical arrow in FIG. 1A. Upper chamber 16 acts as a manifold in that the air is uniformly distributed over the entire length of upper chamber 16. The air passes then through openings 23 of wall 25 and into lower chamber 18. Lower chamber 18 also acts as a manifold in that the air is uniformly distributed over the entire length of lower chamber 18. The air then passes through apertures 29 in insert 13, and the air is then directed onto the surfaces of the glass containers (e.g., the finish of the containers, which is not shown) that face the lower-facing surfaces 27 of insert 13. It should be understood that the chemical coating is not delivered through the insert 13, rather, it is sprayed onto the glass container by a separate spray device (not shown).

To remove an existing insert 13 and install a different insert 13' for accommodating glass containers having a different shape and/or size, it is necessary to first remove panel 32 that is mounted to the front-facing surface of panel 22 by one or more fasteners 34. Panel 32 is omitted from FIG. 1B because insert 13 is shown in the process of being installed onto center section 12. Once panel 32 is removed, insert 13 is simply slid in a reverse horizontal direction (see FIG. 1B) away from center unit 12 until it is no longer positioned in center unit 12. The new insert 13' is then ready to be installed into center unit 12. First, rails 28 of insert 13' are positioned on top of rails 26 of panel 22, and then insert 13' is slid in a forward horizontal direction until the rear end of insert 13' abuts with a rear surface (not shown) of panel 22. Panel 32 is then reinstalled to captivate insert 13' inside center section 12. The lower edge 35 of panel 32 extends to an elevation beneath the rails 28 of insert 13' so that insert 13' (or any other insert) cannot be removed without first removing panel 32. The insert can be hot-swapped, i.e., replaced without halting operation of the entire coating hood, with another insert in a matter of minutes, thereby minimizing downtime for the coating hood. Preferably, the insert can be hot-swapped with another insert in less than 10 minutes. More preferably, the insert can be hot-swapped with another insert in less than 5 minutes.

According to one aspect of the invention, inserts 13, 13' and 13" may all be provided in the form of a kit that is provided along with center section 12. An end-user can select the appropriate insert 13, 13' and 13" for use in a particular coating operation.

It should be understood that the above described method is not limited to any particular step or sequence of steps.

The invention further includes the following embodiments.

1. An apparatus (12) for coating glass articles comprises an elongated housing structure (22) having (i) two or more walls (25) defining an interior chamber (18) for receiving pressurized air or other fluid, and (ii) a mounting surface (26) defined along at least a portion of one of the walls. An insert (13) is removably configured on the mounting surface (26), the insert (13) having apertures (29) for distributing the pressurized air or other fluid from the chamber (18) onto a surface of the glass articles that are positioned adjacent the insert (13).
2. The apparatus of embodiment 1, wherein the mounting surface (26) is defined on a free end of one of the two or more walls.
3. The apparatus of any of embodiments 1 to 2, wherein the mounting surface (26) extends horizontally and perpendicular to said one of the two or more walls of the elongated housing structure from which the mounting surface (26) depends.
4. The apparatus of any of embodiments 1 to 3, wherein each mounting surface (26) is a curved lip that is configured to engage with a complimentary surface (28) of the insert (13) to retain the insert (13) on the housing structure (22).
5. The apparatus of any of embodiments 1 to 4, wherein the housing structure (22) comprises a panel having a first wall (25) and two perpendicular walls extending substantially perpendicularly from opposing sides of the first wall (25), and wherein the mounting surface (26) is defined on a free end of each perpendicular wall, the first wall (25) and the perpendicular walls comprising the two or more walls of the housing structure (22).
6. The apparatus of any of embodiments 1 to 5, wherein the first wall (25) of the housing structure includes openings (23) for directing air into the chamber (18).
7. The apparatus of any of embodiments 1 to 6, wherein the apparatus (12) comprises a second chamber (16) is positioned adjacent said chamber (18), wherein said chambers are in fluid communication with each other by the openings (23) formed in the first wall (25).
8. The apparatus of embodiment 7, wherein the second chamber (16) is at least partially defined by a second panel (20) that is mounted to the panel (22).
9. The apparatus of any of embodiments 1 to 8, wherein the apparatus (12) comprises a conduit (14) that is mounted to the second panel (20), the conduit (14)

being fluidly connected to a source of pressurized air to deliver air through the conduit (14) and into the second chamber (16).

10. The apparatus of any of embodiments 1 to 9, wherein the insert (13) is not fixedly mounted to the mounting surface (26).

11. The apparatus of any of embodiments 1 to 10, wherein the apparatus (12) further comprises an access panel (32) that is mounted to the housing structure (22) for constraining the insert (13) within the chamber (18), wherein the insert (13) is removable from the apparatus (12) upon either moving or removing the access panel (32).

12. The apparatus of any of embodiments 1 to 11, wherein the insert (13) is an integral component formed from sheet metal or plastic.

13. The apparatus of any of embodiments 1 to 12, wherein the insert (13) extends away from the chamber (18) to an elevation beneath the housing structure (22).

14. The apparatus of any of embodiments 1 to 13, wherein the insert (13) is hot swappable.

15. The apparatus of any of embodiments 1 to 14, wherein the apparatus (12) further comprises a second chamber (16) that is positioned to deliver the pressurized air into said chamber (18).

16. The apparatus of any of embodiments 1 to 15, wherein the second chamber (16) is positioned above, below, adjacent or within the chamber (18).

17. A kit for coating glass articles comprises an elongated housing structure (22) having (i) two or more walls (25) defining an interior chamber (18) for receiving pressurized air or other fluid, and (ii) a mounting surface (26) defined along at least a portion of one of the walls. The kit further comprises a plurality of inserts (13, 13', 13"), each insert (13, 13', 13") being configured to be removably positioned on the mounting surface (26) of the elongated housing structure (22), and each insert (13, 13', 13") having apertures (29) for distributing the air or other fluid from the chamber (18) onto a surface of the glass articles, wherein each insert (13, 13', 13") has a different arrangement of apertures (29) for directing the air or other fluid onto the glass articles.

18. The kit of embodiment 17, wherein one insert (13) of the plurality of inserts (13, 13', 13") extends to a different elevation with respect to the mounting surface (26) than another insert (13") of the plurality of inserts (13, 13', 13").

19. The kit of any of embodiments 17 to 18, wherein the apertures (29) of one insert (13) of the plurality of inserts (13, 13', 13") are positioned at a different elevation from the apertures (29) of another insert (13") of the plurality of inserts.

20. A method for changing an airflow pattern in an apparatus (12) for coating glass articles comprises the steps of:
(a) moving an access panel (32) of the apparatus (12) to gain access to a chamber (18) defined within the apparatus (12), wherein the chamber (18) is configured to receive pressurized air or other fluid;
(b) removing a first insert (13) that is positioned within the chamber (18) from the apparatus (12); and
(c) positioning a second insert (13') into the chamber (18) in place of the first insert (13), whereby each insert (13, 13') includes a series of apertures (29) that direct the air or other fluid in a particular airflow pattern from the chamber (18) and onto the glass articles positioned adjacent the insert (13), and the flow pattern defined by the second insert (13') differs from the flow pattern defined by the first insert (13).

21. The method of embodiment 20, wherein prior to step (a), the method further comprises operating a source of pressurized air to deliver pressurized air through the first insert (13) and onto the glass articles.

22. The method of any of embodiments 20 to 21, wherein after step (c), the method further comprises returning the access panel (32) to its initial position and operating the source of pressurized air to deliver pressurized air through the second insert (13') and onto the glass articles.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspect of the invention described herein.

Numerous variations, changes and substitutions will occur to those skilled in the art without departing from the spirit of the invention. Accordingly, it is intended that the appended claims cover all such variations as fall within the spirit and scope of the invention.

What is claimed is:

1. An interchangeable center section (12) of a coating hood for coating surfaces of glass containers which accommodates glass containers having different sizes and/or shapes,
said interchangeable center section (12) comprising,
(i) an upper panel (20), and a lower panel (22), each of said upper and lower panels comprising respectively a horizontal wall and two depending legs forming vertical walls extending beneath the horizontal wall, at least two or more of said walls defining a first interior chamber (16) for receiving pressurized air or other fluid,
(ii) (ii) a mounting surface (26) defined along at least a portion of at least one of said vertical walls of said lower panel (22); and
(iii) an interchangeable insert (13) that is removeably interconnected to or mounted on said mounting surface (26) of said lower panel (22) and positioned at an elevation beneath the lower panel (22) such that a second interior chamber (18) is formed in the center section (12) between an interior surface of lower panel (22) and a top-facing surface of the interchangeable insert (13).

2. The apparatus of claim 1, wherein the mounting surface (26) is defined on a free end of one of the vertical walls of said lower panel (22).

3. The apparatus of claim 2, wherein the mounting surface (26) extends horizontally and perpendicular to said one of the two or more horizontal walls of the lower panel (22) from which the mounting surface (26) depends.

4. The apparatus of claim 2, wherein each mounting surface (26) is a curved lip that is configured to engage with a complimentary surface (28) of the insert (13) to retain the insert (13) on the lower panel (22).

5. The apparatus of claim 1, wherein the two depending legs of the lower panel (22) form two perpendicular walls extending perpendicularly from opposing sides of horizontal wall (25) of lower panel (22), and wherein the mounting surface (26) is defined on a free end of each perpendicular wall, of the lower panel (22).

6. The apparatus of claim 1, wherein the horizontal wall (25) of the lower panel (22) includes openings (23) for directing air into the second interior chamber (18).

7. The apparatus of claim 6, wherein said first (16) and second (18) interior chambers are in fluid communication with each other by the openings (23) formed in the horizontal wall (25) of lower panel (22).

8. The apparatus of claim 1 further comprising a conduit (14) that is mounted to the upper panel (20), the conduit (14) being fluidly connected to a source of pressurized air to deliver air through the conduit (14) and into the first chamber (16).

9. The apparatus of claim 1 further comprising an access panel (32) that is mounted to the lower panel (22), wherein the insert (13) is removable from the center section (12) upon either moving or removing the access panel (32).

10. The apparatus of claim 1, wherein the insert (13) is an integral component formed from sheetmetal or plastic.

11. The apparatus of claim 1, wherein the insert (13) extends away from the second chamber (18).

12. The apparatus of claim 1, wherein the insert (13) is hot swappable.

* * * * *

UNITED STATES PATENT AND TRADEMARK OFFICE
CERTIFICATE OF CORRECTION

Page 1 of 2

PATENT NO. : 10,773,264 B2
APPLICATION NO. : 15/777687
DATED : September 15, 2020
INVENTOR(S) : Jeremy Jon Nihart, Ryan Christopher Smith and Jeffery Lee Stricker It is certified that error appears in the above-identified patent and that said Letters Patent is hereby corrected as shown below:

In the Claims

At Column 8, Line 51 in Claim 2, "The apparatus of claim 1" should read "The interchangeable center section (12) of claim 1"

At Column 8, Line 54 in Claim 3, "The apparatus of claim 2" should read "The interchangeable center section (12) of claim 2"

At Column 8, Line 58 in Claim 4, "The apparatus of claim 2" should read "The interchangeable center section (12) of claim 2"

At Column 8, Line 62 in Claim 5, "The apparatus of claim 1" should read "The interchangeable center section (12) of claim 1"

At Column 9, Line 1 in Claim 6, "The apparatus of claim 1" should read "The interchangeable center section (12) of claim 1"

At Column 9, Line 4 in Claim 7, "The apparatus of claim 6" should read "The interchangeable center section (12) of claim 6"

At Column 9, Line 8 in Claim 8, "The apparatus of claim 1" should read "The interchangeable center section (12) of claim 1"

At Column 9, Line 13 in Claim 9, "The apparatus of claim 1" should read "The interchangeable center section (12) of claim 1"

At Column 9, Line 17 in Claim 10, "The apparatus of claim 1" should read "The interchangeable center section (12) of claim 1"

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,773,264 B2

At Column 9, Line 19 in Claim 11, "The apparatus of claim 1" should read "The interchangeable center section (12) of claim 1"

At Column 9, Line 21 in Claim 12, "The apparatus of claim 1" should read "The interchangeable center section (12) of claim 1"